United States Patent [19]

Yumoto

[11] Patent Number: 5,445,501
[45] Date of Patent: Aug. 29, 1995

[54] SNAP ACTION FLOAT VALVE ASSEMBLY FOR LIQUID FEEDING DEVICE

[75] Inventor: Hideaki Yumoto, Kakogawa, Japan

[73] Assignee: TLV Co., Ltd., Kakogawa, Japan

[21] Appl. No.: 206,772

[22] Filed: Mar. 7, 1994

[30] Foreign Application Priority Data

Mar. 17, 1993 [JP] Japan .................................. 5-084090
Sep. 14, 1993 [JP] Japan .................................. 5-252607

[51] Int. Cl.⁶ ...................... F04B 9/123; F16K 31/26; F16K 31/56
[52] U.S. Cl. ...................... 417/133; 417/134; 251/75; 137/418
[58] Field of Search ............... 417/130, 131, 132, 133, 417/134, 138; 251/75, 243; 137/398, 418, 420

[56] References Cited

U.S. PATENT DOCUMENTS

| | | | |
|---|---|---|---|
| 1,207,679 | 12/1916 | Boylan . | |
| 1,249,939 | 12/1917 | Falwell . | |
| 1,293,789 | 2/1919 | Jay | 417/134 |
| 1,398,206 | 11/1921 | Sparks . | |
| 1,473,384 | 11/1923 | Rogers . | |
| 1,493,640 | 5/1924 | Nachbaur | 137/418 |
| 1,528,085 | 3/1925 | Schultz | 417/133 |
| 1,542,509 | 6/1925 | Kueny . | |
| 1,549,566 | 8/1925 | Bain | 137/418 |
| 1,583,461 | 5/1926 | Harvey . | |
| 1,655,729 | 1/1928 | Jones . | |
| 1,657,679 | 1/1928 | Knudstrup . | |
| 1,672,610 | 6/1928 | Goff . | |
| 1,686,299 | 10/1928 | Veitch | 417/133 |
| 2,033,270 | 3/1936 | Woehlke | 417/130 |
| 2,067,836 | 1/1937 | Foulds | 137/418 |
| 2,075,548 | 3/1937 | Schaser | 137/418 |
| 2,095,485 | 10/1937 | Bassett | 137/418 |
| 2,116,592 | 5/1938 | Bassett | 137/418 |
| 2,606,543 | 8/1952 | Rappl | 137/418 |
| 3,601,157 | 8/1971 | Milleville et al. . | |
| 3,870,079 | 5/1975 | Finke et al. . | |
| 3,930,755 | 1/1976 | Lahr et al. . | |
| 4,342,328 | 8/1982 | Matta . | |
| 4,782,862 | 11/1988 | Nguyen . | |
| 5,141,405 | 8/1992 | Francart, Jr. | 417/133 |

FOREIGN PATENT DOCUMENTS

| | | | |
|---|---|---|---|
| 1223714 | 5/1959 | France | 137/418 |
| 50-147228 | 5/1974 | Japan . | |
| 26407 | of 1911 | United Kingdom . | |
| 12349 | of 1916 | United Kingdom . | |
| 159833 | 3/1921 | United Kingdom | 417/133 |

OTHER PUBLICATIONS

Catalog for GestraPump (undated).
Catalog for Spirax Sarco pumps, 1990.

*Primary Examiner*—Richard A. Bertsch
*Assistant Examiner*—Roland G. McAndrews, Jr.
*Attorney, Agent, or Firm*—Jordan and Hamburg

[57] ABSTRACT

A device for feeding liquid under pressure comprises a vessel having an operating fluid inlet, an operating fluid outlet, an inlet opening for the liquid to be fed under pressure and an outlet opening for the liquid to be fed under pressure; a float disposed within said vessel; a change-over valve for alternately switching the operations of opening and closing the operating fluid inlet and outlet in response to the movement of the float; and a link mechanism. The link mechanism comprises a valve operating rod connected to the change-over valve and a compression spring supported at one end thereof by the valve operating rod and adapted not to cross any fulcrum at the time of operation thereof, and operates to move the valve operating rod in a snap motion in response to the movement of the float. The compression spring is supported by the valve operating rod so that the vector of action of the compression spring passes onto the point connecting the compression spring with the valve operating rod.

2 Claims, 4 Drawing Sheets

SNAP ACTION FLOAT VALVE ASSEMBLY FOR LIQUID FEEDING DEVICE

BACKGROUND OF THE INVENTION

The present invention relates to a device for feeding liquid such as water, fuel or the like under pressure. The device for feeding liquid under pressure according to the invention is suitable particularly for a device for collecting condensate generated in a steam piping system at one time and sending the condensate to a boiler or some equipment utilizing waste heat.

Most of the condensate condensed and generated in the steam piping system still has a substantial amount of heat. For effective utilization of such energy, condensate recovering systems are widely used in which condensate is recovered using a device for feeding liquid under pressure and the condensate is sent to a boiler or some waste heat-utilizing equipment to effectively utilize the waste heat.

The liquid pressure-feeding device utilized in such a condensate recovering system functions to collect condensate in a sealed vessel at one time, introduce an operating high pressure fluid such as steam or the like into the sealed vessel by switching a change-over valve and forcibly discharge the condensate within the sealed vessel by the pressure of the operating fluid.

In order to operate the liquid pressure-feeding device at a high level of efficiency, it is necessary to accumulate as much condensate as possible in the sealed vessel and to switch the change-over valve to introduce the high pressure operating fluid just at the right time.

Accordingly, in most of the liquid pressure-feeding devices, snap mechanisms using coil springs have hitherto been generally employed to ensure the switching of the change-over valve. The liquid pressure-feeding device, in which a coil spring is used, is disclosed in U.S. Pat. No. 5,141,405.

FIG. 5 shows the main construction of a snap mechanism in the liquid pressure-feeding device having the inlet valve of its change-over valve in a closed state. The snap mechanism 100 is composed of a float arm 101, a sub-arm 102 and a compressed coil spring 103. The float arm 101 is fitted for oscillating motion to a support frame 105 with a pin 106, and a float 108 is secured to the front end of the float arm 101 at the opposite side.

The sub-arm 102 is connected at its one end to the support frame 105 for oscillating motion with the same pin 106 as the float arm 101 and is connected at the other end to one end of the coil spring 103 with a pin 110. To the center of the sub-arm 102 is connected a valve operating rod 111 with a pin 107. The valve operating rod 111 is connected to a change-over valve 120 shown in FIG. 6. In FIG. 6, the inlet valve is in an opening state. That is, an actuating rod 121 at the lower portion of the change-over valve 120 is connected to the valve operating rod 111. The actuating rod 121 and valve operating rod 111 may be one and the same member.

The change-over valve 120 comprises a gas inlet valve 122 and a gas outlet valve 123, which are opened and closed respectively, accompanying the upward movement of the valve operating rod 111. A ball-like gas inlet valve body 124 is disposed in the gas inlet valve 122 and a flat plate-like gas outlet valve body 125 is disposed in the gas outlet valve 123, said valve bodies being connected to the actuating rod 121.

Referring to FIG. 5, the end of the coil spring 103 remote from the sub-arm 102 is connected to the float arm 101 with a pin 112. In the liquid pressure-feeding device, when condensate accumulates within a sealed vessel (not shown), a spring bearing member 115 is also raised along with a rise of the float 108; however, the sub-arm 102 remains at the same position because of the gas outlet valve body 125 of the change-over valve 120 being in the closed position by way of the valve operating rod 111 and actuating rod 121 and because of the fixed pin 106, so that a spring bearing member 116 is pivotally moved and the coil spring 103 is compressed and deformed. The reaction force due to the compression and deformation of the coil spring 103 acts on the pin 110 in such a manner as to cause the sub-arm 102 to be pivotally moved clockwise.

Further rise of the float 108 brings about an agreement of the coil spring 103 with the sub-arm 102 on a straight line. Then, when the position of the spring bearing member 115 further rises and the angle which the coil spring 103 makes with the sub-arm 102 exceeds 180 degrees, the reaction force due to the compression and deformation of the coil spring 103 acts on the pin 110 in such a manner as to cause the sub-arm 102 to be pivotally moved counterclockwise. As a result, the coil spring 103 instantaneously recovers to its original shape, and the connecting portion (pin 110) between the coil spring 103 and the sub-arm 102 is moved down in a snap motion, causing the change-over valve 120 to be drawn downward through the valve-operating rod 111, so that the valve is switched in a short time.

Such a liquid pressure-feeding device enables liquid to be fed under pressure with a simple construction and a better efficiency. However, the pin 107, with which the valve actuating rod 111 is attached, can be easily damaged.

Namely, since in the conventional liquid pressure-feeding device the valve operating rod 111 is adapted to be moved up and down with the pin 106 as a fulcrum for its pivotal movement, the turning moment (torque) acts on the parts of the pin 106 and fitting pin 107 every time there is a snap switching operation and is subjected to wear.

Further, the change-over valve 120 is of such a construction that when one of the valve parts of the gas inlet and outlet valve mechanism is closed, the other valve part is opened, and as understood from the relationship in the position of both valve parts 122, 123 and the actuating rod 121 in FIG. 6, the actuating rod 121 can not be subjected to a shock along the center axis of the actuating rod 121 at the time of the switching operation of the change-over valve 120, but the actuating rod 121 and, therefore, the valve operating rod 111 act to rotate the axis thereof relative to the fitting pin 107. As a result, the pin 107 and the valve operating rod 111 are not brought into uniform contact with each other, and therefore, the pin 107 is subjected to bias wear and is damaged.

When wear of the pin 106 is increased and the pin 107 is damaged, switching of the change-over valve 120 can not be ensured and liquid can not efficiently be fed under pressure.

SUMMARY OF THE INVENTION

Accordingly, it is an object of the invention to pay attention to the above-mentioned problems in the prior art and to provide a liquid pressure-feeding device in which the pin connecting the valve operating rod to the snap mechanism and the pin at the switching fulcrum are less damaged, and which is superior in durability.

According to the invention, there is provided a device for feeding liquid under pressure comprising:
- a vessel having an operating fluid inlet, an operating fluid outlet, an inlet opening for the liquid to be fed under pressure and an outlet opening for the liquid to be fed under pressure;
- a float disposed within said vessel,
- a change-over valve for alternately switching the operations of opening and closing the operating fluid inlet and outlet in response to the movement of the float, and
- a link mechanism which comprises a valve operating rod connected to the change-over valve and a compression spring supported at one end thereof by the valve operating rod and adapted not to cross any fulcrum at the time of operation thereof, said link mechanism operating to move the valve operating rod in a snap motion in response to the movement of the float;
- said compression spring being supported by the valve operating rod so that the vector of action of the compression spring passes onto the point connecting the compression spring with the valve operating rod.

The, technical means of the present invention provided to achieve the above-mentioned technical object lies in the fact that in the liquid pressure-feeding device as constructed above, the compression spring is supported by the valve operating rod so that the vector of action of the compression spring passes onto the point connecting the compression spring with the valve operating rod.

Preferably, the link mechanism comprises (i) the valve operating rod connected to the change-over valve, (ii) a lever which swings in the direction opposite the movement of the float, and (iii) a compression spring which is supported at one end thereof by the lever on the end remote from the fulcrum for swing motion thereof .and at the other end by the valve operating rod, and which is compressed between the lever and the valve operating rod to bring the lever into a tensioned condition.

More preferably, the valve operating rod is guided by a plurality of guide members provided with portions which receive an impact caused when the change-over valve is operated, to perform the switching operation of the change-over valve.

The device for feeding liquid under pressure according to the invention functions, similarly to the publicly known device, in such a manner that movement of the float accompanied by an increase in the collected quantity of the liquid to be fed under pressure causes the compression spring to be moved in a snap motion, so that the change-over valve is switched to introduce high pressure operating fluid into the sealed vessel, thereby feeding the collected liquid under pressure. Since the impact produced when the switching operation due to a snap motion is made, is dispersed into three supporting fulcrums of the snap mechanism, and since no turning moment (torque) is substantially produced at any of the fulcrums, the lifetime of each of the fulcrums is extended. In addition, since the valve operating rod provided in the liquid pressure-feeding device is guided by a plurality of guide members provided at the lateral sides thereof so that the path of movement of the valve operating rod is not shifted, the fitting pin with which the snap mechanism is fitted to the valve operating rod, is not subjected to deflected wear when the change-over valve is switched.

Other features and advantages of the invention will be apparent from the following description taken in connection with the accompanying drawings.

DETAILED DESCRIPTION OF PREFERRED EMBODIMENTS

Now, the present invention will be explained in detail by way of example with reference to the drawings showing the embodiments of the invention.

Figure 1:
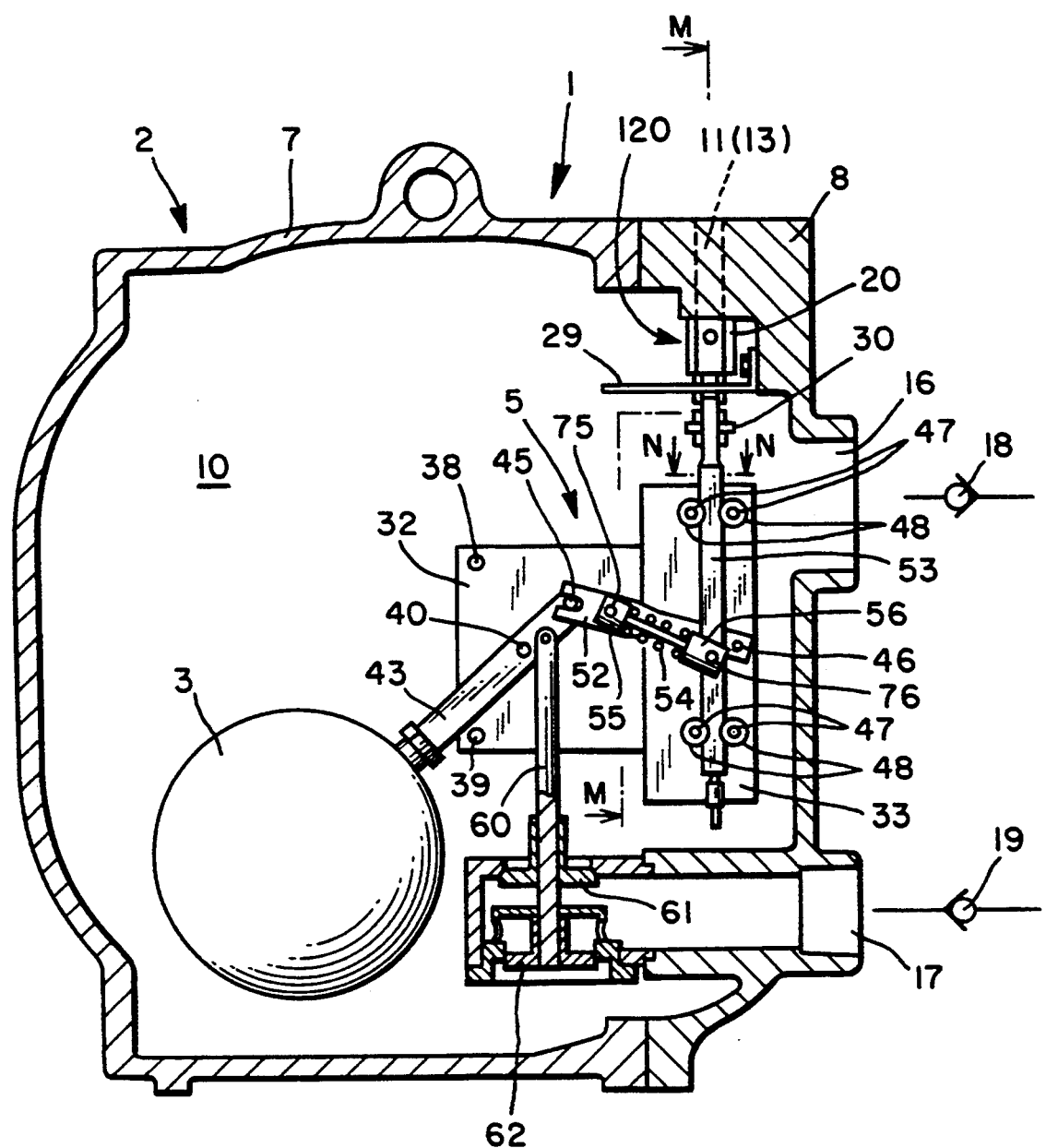
FIG. 1 is a sectional view of a liquid pressure-feeding device of an embodiment of the invention.

Referring to FIG. 1, a device 1 for sending liquid under pressure, comprises a float 3 and a snap mechanism 5 arranged within a sealed vessel 2.

A body 7 and a lid 8 of the sealed vessel 2 are connected by means of screws (not shown), and a space 10 for accumulating liquid is formed therein. In the present embodiment, the body 7 of the sealed vessel 2 is fundamentally merely the one for accommodating liquid, and the featured components of the present embodiment are provided generally in the lid 8 of the sealed vessel 2.

Namely, in the lid 8 are provided four openings, specifically an outlet 11 for discharging an operating fluid, an inlet 13 for introducing the operating fluid, formed at this side of the drawing sheet parallel to the outlet 11 (refer to FIG. 2), an inlet opening 16 for the liquid to be fed under pressure and an outlet opening 17 for the liquid to be fed under pressure.

Figure 2:
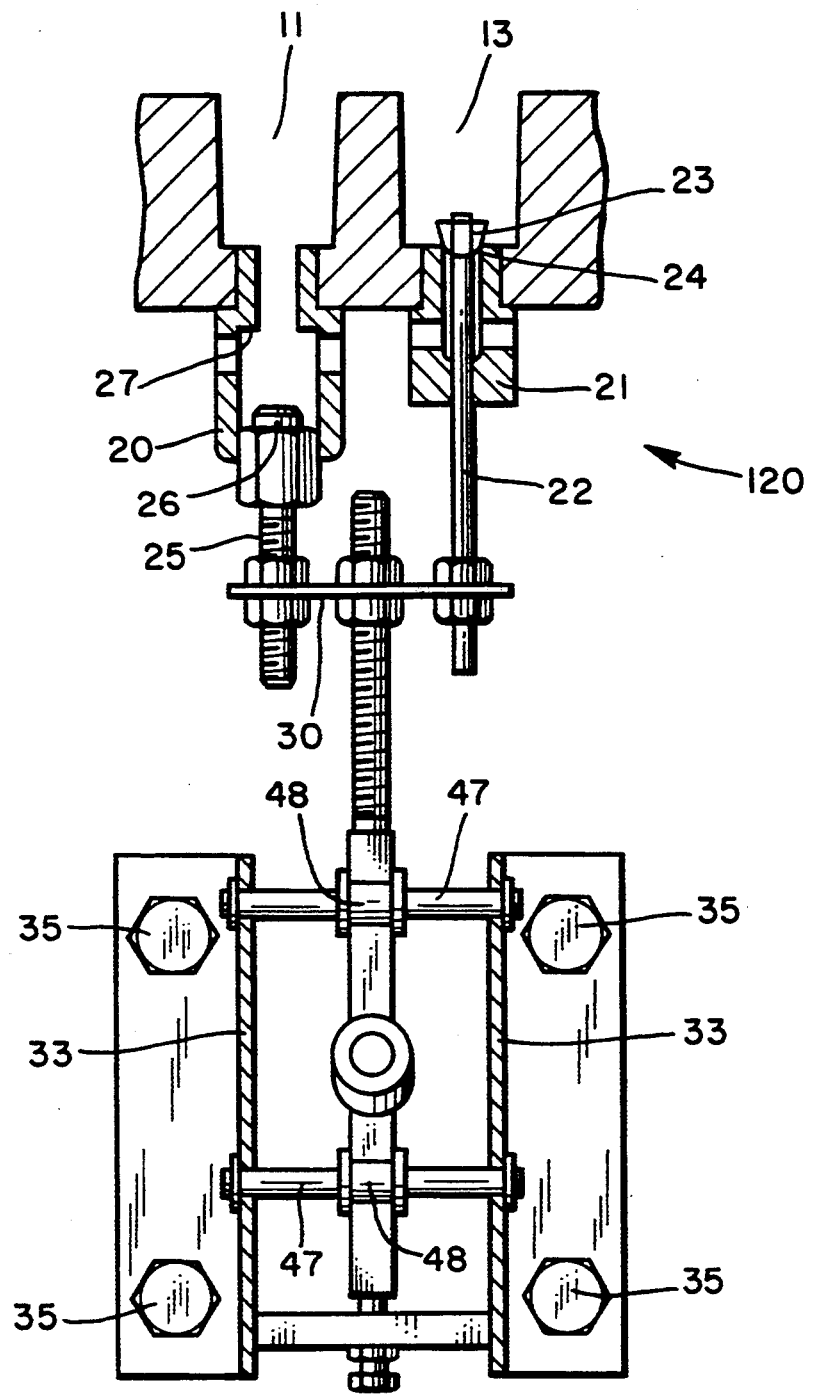
FIG. 2 is a sectional view taken along line 2—2 of FIG. 1.
Figure 6:
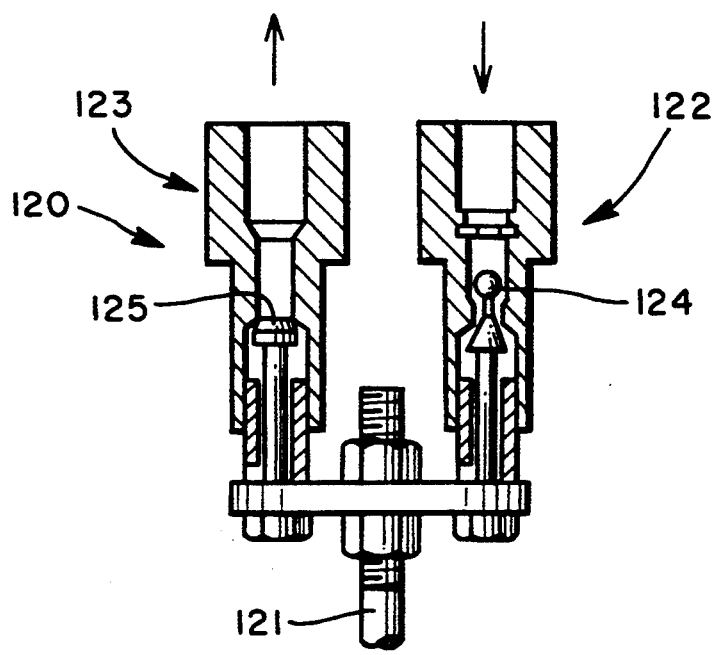
FIG. 6 is an enlarged sectional view of a change-over valve used in the conventional liquid pressure-feeding device.

The operating fluid outlet 11 and the operating fluid inlet 13 in FIG. 1 are arranged side by side vertically with respect to the surface of the drawing sheet thereof, that is, in the positions shown in FIG. 2. An outlet valve 20 is housed in the operating fluid outlet 11 and an inlet valve 21 is housed in the operating fluid inlet 13, said inlet and outlet valves constituting a change-over valve 120 similar to the valve shown in FIG. 6. Pulling a stem 22 of the inlet valve 21 toward the interior of the vessel 2 brings a valve body 23 into abutting engagement with a valve seat 24, thereby closing the operating fluid inlet 13. Pressing a stem 25 of the outlet valve 20 toward the operating fluid outlet 11 brings a valve body 26 into abutting engagement with a valve seat 27, thereby closing the operating fluid outlet 11. The respective stems 25 and 22 of the outlet valve 11 and inlet valve 13 are connected by a connecting plate 30, so that upward and downward movement of the connecting plate 39 causes one of the outlet valve 20 and inlet valve 21 to be opened and the other to be closed.

In FIG. 1, the member indicated with the reference numeral 29 is a steam deflecting plate, which functions as a baffle board for preventing steam ejected from the inlet valve from blowing directly against the condensate accumulated within the liquid accumulating space 10.

The inlet opening 16 for the fluid to be fed under pressure is provided substantially in the center region of the lid 8, as shown in FIG. 1, and the outlet opening 17 for the liquid to be fed under pressure is provided at the level of the lid 8 corresponding to the lower portion of the sealed vessel 2.

A float 3 is supported by a pair of bracket plates 32 through a float arm 43 and a fixing pin 40, and the snap mechanism 5 is supported by a further pair of bracket plates 33. The bracket plates 32 and 33 are connected to each other and secured to the lid 8 of the sealed vessel 2 by means of fitting screws 35, as shown in FIG. 2.

Fixing pins 38 and 39 provided so as to bridge the bracket plates 32 also serve as the upper and lower limit stoppers for the float arm 43, respectively. Further, the fixing pin 40 also serves as the swinging shaft of the float 3. Namely, the float 3 swings up and down about the pin 40 fitted through the float arm 43. In addition, to the other end of the float arm 43 is secured a connecting pin 45 to connect it to the snap mechanism 5.

As can be understood from FIGS. 1 and 2, four roller shafts 47 and a pin 46 functioning as a swinging fulcrum of the snap mechanism are provided between the two opposite fitting bracket plates 33 so as to bridge them. Guide rollers 48 are rotatably mounted on the roller shafts 47 disposed so as to sandwich a slider 53. Each guide roller 48 is provided with flanges 50 at both ends of a roller body 49, as shown in FIG. 3.

The, snap mechanism 5 comprises the float arm 43, a lever 52, the slider 53 which functions as the valve operating rod, a coil spring 54, and spring bearing members 55, 56 secured to both ends of the coil spring 54. The lever 52 is supported at one end thereof for a swinging movement about the fixing pin 46 provided so as to bridge the fitting bracket plates 33 and is fitted at the other end to the connecting pin 45 of the float arm 43. This allows the lever 52 to be swung up and down about the pin 45 following the rise and drop of the float 3. In FIG. 1, the fulcrum 46 of the swinging lever 52 is fitted at a position near the liquid inlet opening 16. However, even if it is fitted at a position nearer to the float arm than to the slider, it is possible to bias the lever 52 toward the connecting pin 45, that is, in the direction of tension by the coil spring 54.

Figure 3:
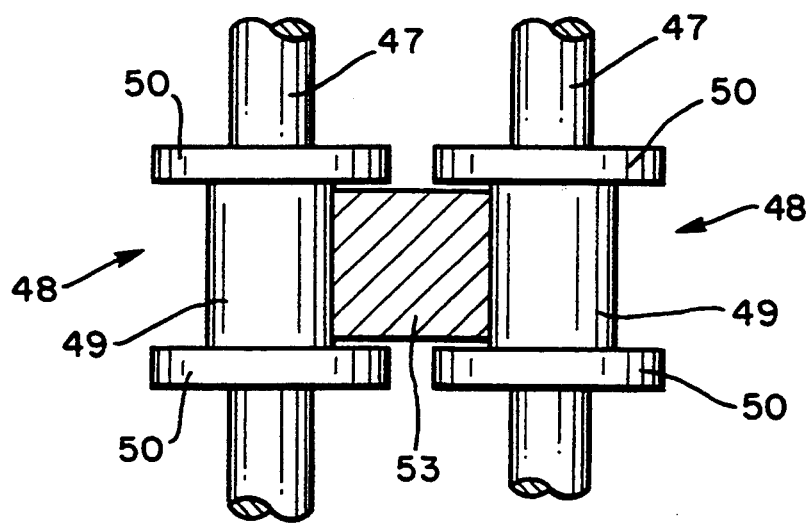
FIG. 3 is a sectional view taken along line 3—3 of FIG. 1.

Since the slider 53 having the cross section of a square as shown in FIG. 3, is held at the side surfaces thereof between the guide rollers 48 mounted on each of the roller shafts 47 as described above, it is movable only in the vertical direction. The form of the cross section of the slider 53 is not limited to the square shown in the drawing and may be a circle. However, it must be a form suitable for receiving the external force which acts in the direction intersecting with the axial direction of the slider 53. The upper end of the slider 53 is connected to the connecting plate 30 linked to the change-over valve 120. The connection of the slider 53 and the lever 52 is made through the coil spring 54 having the spring bearing members 55 and 56 at both ends thereof.

Figure 4:
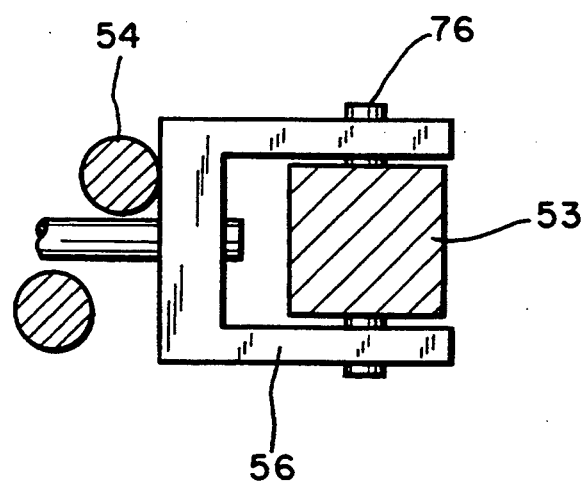
FIG. 4 is a detailed sectional view showing the fitting part of a compression spring and a valve operating rod in the liquid pressure-feeding device in FIG. 1.
Figure 5:
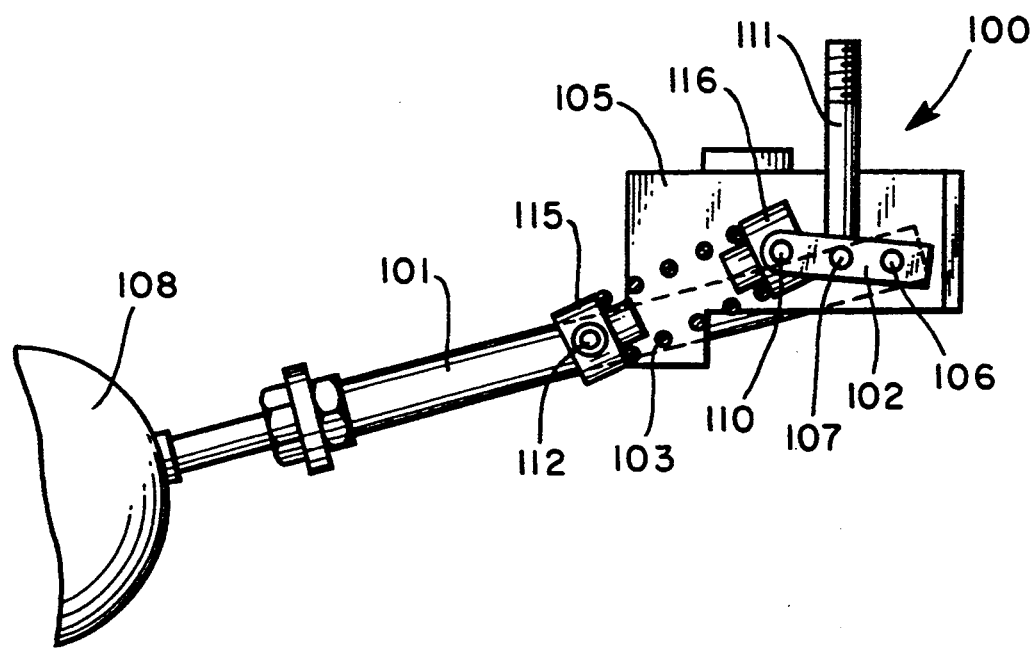
FIG. 5 is a partially enlarged view of a snap mechanism used in a conventional liquid pressure-feeding device.

The coil spring 54 is interposed between the spring bearing members 55 and 56 and fitted around the stem core thereof. The spring bearing member 55 near the connecting pin 45 is supported in the vicinity of one end of the lever 52 by a pin 75, and the other spring bearing member 56 is supported in substantially the middle of the slider 53 by a pin 76. Accordingly, the coil spring 54 acts on the lever 52 to press it against the connecting pin 45. Further, the coil spring 54 fitted around the stem core of the spring bearing members 55 and 56, which are connected to the lever 52 and the slider 53, respectively, is in a compressed condition. The spring bearing members 55, 56 have the stem core connecting them to each other. The stem core is supported by the respective bearing portions and capable of a sliding movement. The state of such a connection in the spring bearing member 56 at the side of the slider 53 is shown in FIG. 4 by way of an example.

Below the float arm 43 exists double valves 61, 62 which function to communicate and shut off between the liquid outlet opening 17 and the liquid accumulating space 10. A valve rod 60, on which the double valves 61, 62 are firmly mounted, is fitted at one end thereof to the vicinity of the pin 40 of the float arm 43, so that the double valves 61, 62 are moved down away from their respective valve seats in response to a rise of the float 3, causing a communication between the liquid accumulating space 10 and the liquid outlet opening 17, and a drop of the float 3 brings the double valves into a seating engagement with the valve seat, the double valves thereby shutting off between the liquid accumulating space 10 and the liquid outlet opening 17.

The operation of the device will be explained by pursuing a series of movements in the case where pressure steam is used as an operating fluid and the liquid to be fed under pressure is condensate. First, the operating fluid inlet 13 is connected to a source of high pressure steam and the operating fluid outlet 11 is connected to a piping of circulating steam. Further, the liquid inlet opening 16 is connected to some loaded steam-consuming equipment or the like through the check valve 18 which is adapted to open from the exterior toward the liquid accumulating space 10. On the other hand, the liquid outlet opening 17 is connected to some waste heat utilizing equipment through the check valve 19 which is adapted to open from the liquid accumulating space 10 toward the exterior. Normally, even if the float 3 rises to open the double valves 61, 62, the check valve 19 is not opened so long as the liquid accumulating space 10 is not in a pressurized state due to the inflow of pressure steam from the operating fluid inlet 13.

Unless condensate exists within the liquid accumulating space 10 of the liquid pressure-feeding device 1 of the present embodiment, the float is positioned at the bottom of the vessel. In the snap mechanism 5 at this time, the connecting portion of the coil spring 54 and slider 53 (pin 76) is positioned lower than the connecting portion of the coil spring 54 and lever 52 (pin 75). Accordingly, the coil spring 54 presses the slider 53 obliquely and downwardly to the right. Namely, the slider 53 is pressed downwardly by the vertical downward component of the biasing force of the coil spring 54 and brought into abutting engagement with a lower stopper, so that it is stopped at a predetermined position. The horizontal transversal component of the biasing force of the coil spring 54 which acts through the pin 76 is received by the guide rollers 48.

The connecting plate 30 connecting the slider 53 to the change-over valve 120 is drawn downwardly toward the liquid accumulating space 10 by the slider 53, so that in the change-over valve the inlet valve 21 is closed and the outlet valve 20 is opened (refer to FIG. 2). The double valves 61, 62 are raised by the valve stem 60 to close the liquid outlet opening 17.

When condensate is produced in some steam consuming equipment or the like, it flows from the liquid inlet opening 16 into the liquid pressure-feeding device 1 and accumulates within the liquid accumulating space 10. When the float 3 rises due to the condensate which accumulates within the liquid accumulating space 10, pivotal movement of the float arm 43 connected to the float 3 with the pin 40 as a fulcrum causes the lever 52 to be pivotally moved slowly about the pin 46 counterclockwise to bring about a gradual drop of the spring bearing member 55 and to gradually open the double valves 61, 62. Since the slider 53 is pressed to its lowest position by the biasing force of the coil spring 54, the other spring bearing member 56 is Pivotally moved slightly about the pin 76 but is not shifted.

Along with the movement of the lever 52 about the pin 46, the spring bearing members 55, 56 approach each other and the distance between the pins 75 and 76 becomes short, so that the coil spring 54 is more compressed, thereby accumulating a compression energy in the coil spring 54.

A further rise of the float 3 increases the above-mentioned pivotal movement of the lever 52, which comes to a position just before the beginning of a snap motion, that is, the position where the coil spring 54 is perpendicular to the slider 53. When the float further rises slightly over such a position, the connecting portion (pin 75) of the lever 52 and coil spring 54 comes to a level lower than the connecting portion (pin 76) of the slider 53 and coil spring 54, so that the vertical relation of both end positions of the coil spring 54 is reversed. Accordingly, the slider 53 is pressed upwardly by the vertical component of the biasing force of the coil spring 54 which is actuated on the slider through the pin 76. As a result, the slider 53 is moved upwardly in a snap motion, and along with the rise of the connecting plate 30 connected to the slider 53, the inlet valve 21 is opened and the outlet valve 20 is closed.

At the time of the snap motion of the slider 53, a compression load is applied perpendicularly to the pin 76 by the coil spring 54; however, no turning moment (torque) is actuated. Further, a turning moment (torque) is actuated on the pin 46 of the lever 52. However, as understood from the arrangement of the lever 52 and coil spring 54 in the snap mechanism 5, the load of the coil spring 54 is dispersed and the turning moment (torque) acting on the pin 46 also becomes considerably small. Moreover, when the inlet valve 21 is opened and the outlet valve 20 is closed, a force is applied to the pin 76 so as to rotate the axis of the pin 76 because the center axis of the outlet valve 20 and that of the slider 53 are shifted relative to each other. However, since such a force is received in a dispersed condition by the guide rollers 48 supporting the slider 53, particularly by the flange 50, deflected wear of the pin 76 is prevented and the lifetime of the snap mechanism 5 is extended.

In the embodiment shown in FIG. 1, a total of four guide rollers 48, two at each side of the slider 53, are used. However, the number of the guide rollers 48 may be suitably selected according to the length of the slider 53 and the spring load of the coil spring 54. Further, the guide rollers 48 are not necessarily disposed on both sides of the slider 53 but may be disposed, for example, only at the right side of the slider as viewed in FIG. 1.

When the operating fluid inlet 13 is opened, high pressure steam is introduced into the sealed vessel 2 and the pressure therein is increased, so that condensate accumulated in the liquid accumulating space 10 is pressed by steam pressure and is fed to some waste heat utilizing equipment in the exterior through the double valves 61, 62, the liquid outlet opening 17 and the check valve 19. As a result, the water level within the liquid accumulating space 10 decreases and the float 3 drops due to its own weight.

Along with a drop of the float 3, the snap mechanism 5 follows an order contrary to the above-mentioned operation order, that is, the lever 52 is pivotally moved clockwise, the coil spring 54 and the slider 53 again take the positional relation of being perpendicular to each other, and at the step of exceeding such a position, the slider 53 is moved in a snap motion in the direction opposite the above-mentioned direction, that is, downwardly.

The liquid pressure-feeding device 1 shown in the drawings is so constructed that the slider is moved up and down. However, the present invention does not limit the direction of the movement of the slider, such that the direction can be arbitrarily changed according to the shape of the sealed vessel, the arrangement of the operating fluid inlet and the like.

What is claimed is:

1. A device for feeding liquid under pressure comprising:
    a vessel having an operating fluid inlet, an operating fluid outlet, an inlet opening for the liquid to be fed under pressure and an outlet opening for the liquid to be fed under pressure,
    a float disposed within said vessel,
    a change-over valve for alternately switching between operations of opening and closing the operating fluid inlet and outlet in response to a movement of said float, and
    a link mechanism which comprises a valve; operating rod connected to said change-over valve and a compression spring, said compression spring being supported at one end by said valve operating rod and at another end by a lever, said compression spring being adapted not to cross any point of connection in said link mechanism during operating of said compression spring, said lever swinging in a direction opposite the movement of said float, said compression spring being compressed between said lever and said valve operating rod for tensioning said lever and said link mechanism operating to move said valve operating rod in a snap motion in response to the movement of said float;
    said compression spring being supported by said valve operating rod so that a vector of action of said compression spring passes onto a point connecting said compression spring with said valve operating rod.

2. A device for feeding liquid under pressure as claimed in claim 1, wherein said valve operating rod is guided by a plurality of guide members provided with portions which receive an impact caused when said change-over valve is operated, to perform the switching operation of said change-over valve.

* * * * *